Jan. 1, 1929.　　　　　　　　　　　　　　　　　1,697,370
P. H. RUPPE
MAGNETO GENERATOR
Filed Oct. 19, 1926
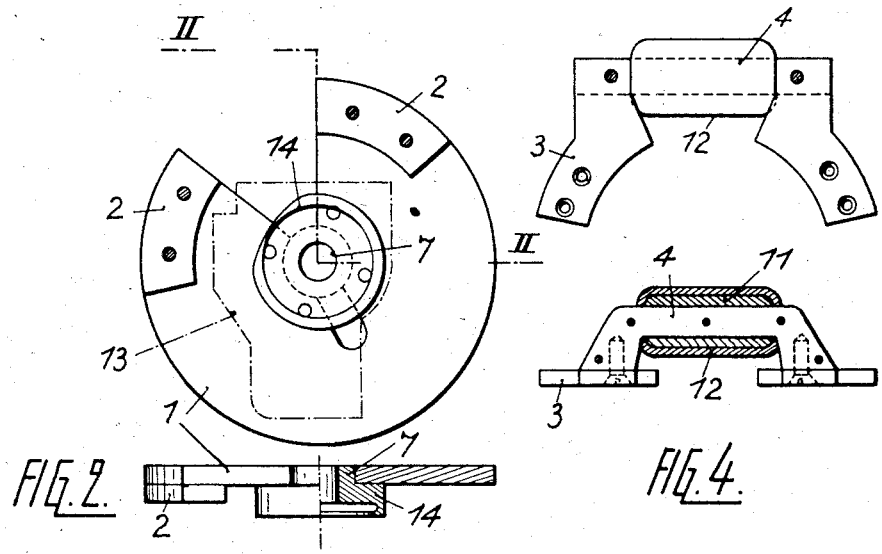
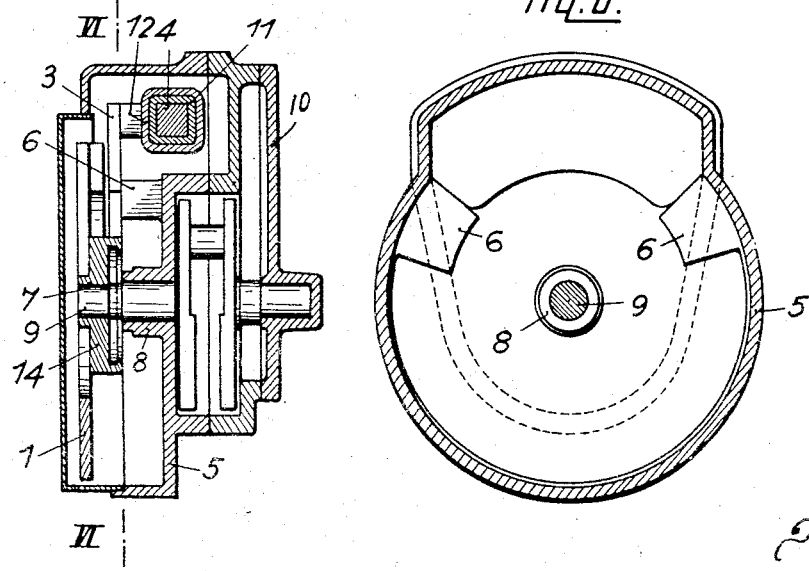

Patented Jan. 1, 1929.

1,697,370

UNITED STATES PATENT OFFICE.

PAUL HUGO RUPPE, OF BERLIN, GERMANY, ASSIGNOR TO THE FIRM: RUPPE MOTOR G. M. B. H., OF BERLIN, GERMANY.

MAGNETO GENERATOR.

Application filed October 19, 1926, Serial No. 142,765, and in Germany April 29, 1926.

This invention relates to a combined flywheel and magneto generator for internal combustion engines, and more especially for engines intended for attachment to ordinary cycles. Its purpose is to make a generator for ignition purposes of small weight and particularly of small width, and to make it readily accessible.

A generator built according to the invention is illustrated in the accompanying drawings of which Figures 1 and 2 show views at right angles of the permanent magnet which also serves as a flywheel and is mounted on the engine shaft.

Figures 3 and 4 show views at right angles of the stationary pole shoes and windings, and Figures 5 and 6 show the complete magnetic generator built into the motor casing in longitudinal section and in cross section on the line VI—VI respectively.

In these drawings 1 is a permanent magnet made in the form of a disc, and attached by a hub 7 to the crank shaft 9 of the engine, to which it serves also as a flywheel. There is a sector cut out of the disc 1 and pole shoes 2 are fastened to the disc on each side of the segmental gap. The magnet is therefore of substantially horse-shoe form. The advantage of this construction is that the gap gives ready access to the interrupter, (not shown) which is secured upon the bearing 8 of the crank shaft 9. The construction has also the advantage, which is of special importance in a magnet of small size, that the path of the magnetic flux is comparatively long, and so the pole strength of the magnet is comparatively large.

Stationary pole shoes 3 are fastened upon bosses 6 in the casing 5 so as to be opposite the pole shoes 2 at one part of their revolution. The casing 5 is of aluminium or other non-magnetic material. The pole shoes 3 are joined by the core 4 which carries the primary winding 11 and the secondary winding 12.

A readily removable cover 10 encloses the crank and completes the enclosure of the generator.

In a further development of the invention the hub 7 of the magnet disc is constructed as a cam to operate the interrupter of the magneto generator. The interrupter is shown at 13 in Figure 1 while 14 indicates the cam projection upon the hub 7.

I claim:—

1. In a combined flywheel and magneto generator for internal combustion engines, particularly for engines to be built into ordinary cycles, a flywheel consisting of a permanent magnet in the form of a disc secured by a hub upon the crank shaft, pole shoes upon said disc, stationary pole shoes fastened in a non-magnetic casing around said disc, and a cover upon said casing enclosing the engine crank and completing the enclosure of the generator.

2. In a combined flywheel and magneto generator for internal combustion engines, particularly for engines to be built into ordinary cycles, a flywheel consisting of a permanent magnet in the form of a disc, stationary pole shoes fastened in a non-magnetic casing around said disc, a core joining said stationary pole shoes, primary and secondary windings upon said core, and a cover upon said casing enclosing the engine crank and completing the enclosure of the generator.

3. In a combined flywheel and magneto generator for internal combustion engines, particularly for engines to be built into ordinary cycles, a flywheel consisting of a permanent magnet in the form of a disc having a sector cut therefrom secured by a hub upon the crank shaft, said disc carrying pole shoes on each side of the gap therein, stationary pole shoes fastened in a non-magnetic casing around said disc, and a cover upon said casing enclosing the engine crank and completing the enclosure of the generator.

4. In an internal combustion engine, a non-magnetic crank case, an easily removable cover thereon, said cover enclosing a flywheel consisting of a permanent magnet in the form of a disc secured by a hub upon the crank shaft, pole shoes upon said disc, and stationary pole shoes fastened in said casing around said disc.

5. In a combined flywheel and magneto generator for internal combustion engines, particularly for engines to be built into ordinary cycles, a flywheel consisting of a permanent magnet in the form of a disc having a sector cut therefrom secured by a hub upon the crank shaft, said disc carrying pole shoes on each side of the gap therein, stationary pole shoes fastened in a non-magnetic casing around said disc, a core joining said stationary pole shoes, primary and secondary winding upon said core, and a cover upon said casing enclosing the engine crank and completing the enclosure of the generator.

6. In a combined flywheel and magneto generator for internal combustion engines, particularly for engines to be built into ordinary cycles, the combination of a flywheel consisting of a permanent magnet in the form of a disc having a sector cut therefrom, pole shoes upon said disc on each side of the gap therein, a non-magnetic casing surrounding said disc, and stationary pole shoes fastened in said casing beside said disc.

7. In a combined flywheel and magneto generator, a flywheel consisting of a permanent magnet in the form of a disc having its centre and a sector cut therefrom and slotted to prolong said sector gap beyond the centre.

In testimony whereof I have signed my name to this specification.

PAUL HUGO RUPPE.